United States Patent
Harvey

(10) Patent No.: US 6,573,943 B1
(45) Date of Patent: Jun. 3, 2003

(54) ALTERNATIVE VIDEO SYNC DETECTOR

(75) Inventor: Barry Harvey, Los Altos, CA (US)

(73) Assignee: Elantec Semiconductor, Inc., Milpitas, CA (US)

( * ) Notice: Subject to any disclaimer, the term of this patent is extended or adjusted under 35 U.S.C. 154(b) by 0 days.

(21) Appl. No.: 09/398,375

(22) Filed: Sep. 17, 1999

(51) Int. Cl.$^7$ ................................................ H04N 5/08
(52) U.S. Cl. ........................ 348/525; 348/521; 348/522
(58) Field of Search ................................ 348/525, 529, 348/530, 531, 521, 522; H04N 5/08, 5/06, 9/45, 9/455

(56) References Cited

U.S. PATENT DOCUMENTS

| | | | | |
|---|---|---|---|---|
| 4,185,299 A | * | 1/1980 | Harford | 348/532 |
| 4,550,342 A | * | 10/1985 | Buchanan et al. | 348/531 |
| 4,667,235 A | * | 5/1987 | Nozoe et al. | 348/464 |
| 4,707,730 A | * | 11/1987 | Alard | 348/525 |
| 5,280,356 A | * | 1/1994 | Hiramatsu et al. | 348/525 |
| 5,486,869 A | | 1/1996 | Cooper | 348/525 |
| 5,754,250 A | | 5/1998 | Cooper | 348/525 |
| 6,208,173 B1 | * | 3/2001 | Redman-White | 327/59 |

* cited by examiner

Primary Examiner—John Miller
Assistant Examiner—Trang U. Tran

(74) Attorney, Agent, or Firm—Fliesler Dubb Meyer & Lovejoy LLP

(57) ABSTRACT

A circuit for generating video synchronization timing signals includes a negative peak detector (FIG. 5) for following variations of a composite video signal (FIG. 1), rather than clamping the most negative voltage of the composite video signal. The negative peak detector provides a voltage level $V_{TIP}$ representative of the voltage at the synchronization tip of the composite video signal. A sample and hold circuit (700, 702, 704) is used to add an offset $V_{SLICE}$ to $V_{TIP}$, $V_{SLICE}$ being a voltage level of the breezeway, color burst, or back porch segments of the composite video signal, or a combination of these segments. The sample and hold circuit generates a signal $V_{REF}$, and is connected by a resistor divider (708,710) to the negative peak detector to form the signal $V_{TIP}+V_{SLICE}$ provided to an amplifier (606) functioning as a comparator. The signal $V_{SLICE}+V_{TIP}$ is compared in comparator (606) with the composite video signal to provide an overall circuit output. Buffering is provided at the input of the negative peak detector by amplifier (600) to reduce any DC offset from the diode of the negative peak detector. To prevent amplifier DC offset error voltages from affecting the perceived $V_{SLICE}$ level, an amplifier (800) can be connected in a first position $T_{TIP}$ as part of a negative peak detector to store $V_{TIP}$ on a capacitor, in a second position $T_H$ as part of a sample and hold circuit to store $V_{REF}$ on a capacitor, and in a third position $T_{COMP}$ to compare $V_{SLICE}+V_{TIP}$ measured from the capacitors with the composite video signal to generate the overall circuit output.

26 Claims, 5 Drawing Sheets

ALTERNATIVE VIDEO SYNC DETECTOR

BACKGROUND OF THE INVENTION

1. Field of the Invention

This invention relates to the field of video circuits. More particularly, this invention relates to a circuit for detecting synchronizing pulses embedded in composite waveforms of a video signal.

2. Description of the Related Art

FIG. 1 illustrates components of a composite video waveform. The composite video waveform contains: a horizontal sync pulse or sync tip used for receiver scan timing; a "breezeway" where the level is a reference for video intensity; a color burst which is a series of sinewaves at a very precise frequency and phase, used as a color reference; a back porch which is a level reference similar to the breezeway occurring after the color burst segment; and the picture occurring after the back porch, the picture being any possible signal up to a maximum level, and whose content is unpredictable to receiver electronics.

The video receiver systems must discover timing details from the sync tip. Unfortunately, the sync tip almost never has a known DC level. In fact, most composite signals are AC coupled and the average DC level varies unpredictably with picture content.

One method for providing a video signal timing reference is to use a circuit which uses the most negative going feature of the composite signal as a reference level. The composite video signal standard which is predominantly used in North America, the National Television Systems Committee (NTSC) standard, was designed to enable such a reference level to be set approximately 50 years ago.

A prior art circuit for setting a reference level at the most negative feature of a composite waveform is the clamping circuit shown in FIG. 2. The circuit includes a capacitor 200 having an input receiving the composite video signal input, and an output providing the composite video signal with its most negative voltage clamped to 0 volts. The circuit further includes a diode 202 and current sink 204 connecting the output of the capacitor 200 to ground. The diode 202 is assumed to be ideal so that it generates no DC offset. The current sink 204 provides a small pull down current $I_{PULL-DOWN}$ to discharge the capacitor 200 and allow the clamped output signal to follow the varying content of the composite input.

A clamped output signal from the circuit of FIG. 2 is shown in FIG. 3. As shown in FIG. 3, the diode of FIG. 2 forces the capacitor coupled composite video signal's most negative voltage, here the sync tip voltage ($V_{TIP}$), to ground level. Because the composite video signal provides transient currents, clamping may distort the composite signal and may be an undesirable method.

To provide a synchronization (sync) timing signal, the clamped output of the circuit of FIG. 2 is provided to a first terminal of comparator 400 shown in FIG. 4, while a DC offset voltage is provided to the second terminal of comparator 400. The sync timing signal is generated when the comparator output transitions. A DC voltage offset generator 402 provides the DC offset voltage at a desired "slice level" ($V_{SLICE}$), as shown in FIG. 3, so that the sync timing signal is generated on an edge of the sync pulse at the voltage $V_{SLICE}$ approximately midway between the sync tip voltage level $V_{TIP}$ and the breezeway voltage level.

SUMMARY OF THE INVENTION

The present invention provides a circuit for following variations of the composite video signal, rather than clamping the most negative voltage of the composite video signal.

The present invention includes a negative peak detector with an input receiving the composite video signal and an output coupled to a first input of a first amplifier the first amplifier functioning as a comparator. The second input of the comparator receives the composite signal, and the output of the comparator provides a synchronization timing signal.

In one embodiment, the present invention further provides buffering at the input and output of the negative peak detector. Buffering is provided to the input with a second amplifier having a noninverting input receiving the composite video signal. The inverting input of the second amplifier is connected to a first terminal of a diode of the peak detector and also to a current source in the negative peak detector. The output of the second amplifier is connected to the second end of the diode of the negative peak detector. The second amplifier serves to buffer the composite video signal from the current source. Buffering at the output of the negative peak detector is provided by a third amplifier connected in a voltage follower configuration between the output of the negative peak detector and the comparator.

In one embodiment, the present invention also includes a voltage slice level offset generator connecting the output of the negative peak detector to the comparator. The slice level offset generator includes a sample and hold circuit and a resistor divider. The sample and hold circuit is configured to sample the composite video signal during the breezeway segment, color burst segment, or back porch segments of the composite video signal, or any combination of the segments. The output of the sample and hold circuit then provides a sample of these segments $V_{REF}$ to a first end terminal of the resistor divider. The second end terminal of the resistor divider is driven by the buffered output of the negative peak detector which provides a synchronization tip voltage signal $V_{TIP}$, and the center terminal of the resistor divider is provided to the first input of the comparator. The comparator output can then provide a timing signal transitioning at a point $V_{SLICE}$ on the composite signal half way between $V_{TIP}$ and $V_{REF}$.

In another embodiment in accordance with the present invention, circuitry is configured to reduce amplifier DC offset which can cause errors in a perceived $V_{SLICE}$ level. The circuitry includes a first amplifier which receives the composite video signal and is connectable by switches in one of three positions $T_{COMP}$, $T_{TIP}$ and $T_H$. In the $T_{COMP}$ position the first amplifier acts as a comparator with no feedback to compare the value $V_{SLICE}+V_{TIP}$ with the composite video signal. $V_{SLICE}$ is set between $V_{TIP}$ and $V_{REF}$ based on values stored on capacitors in the circuit. The $T_{COMP}$ position is used prior to the negative going synchronization tip edge of the composite video signal. After the negative going edge of the synchronization tip, the circuit is set in the $T_{TIP}$ position. In the $T_{TIP}$ position, the output of the first amplifier is disconnected from providing the synchronization timing output, and is connected to provide buffering for a negative peak detector to store $T_{TIP}$ on a capacitor. After the synchronization tip, during the breezeway, color burst or back porch segments of the composite video signal, or during a desired combination of these segments the circuit is connected in the $T_H$ position. In the $T_H$ position, the first amplifier forms part of a sample and hold circuit for storing a value $V_{REF}$ on a capacitor. After the desired period for $T_H$, the circuit is again connected in the $T_{COMP}$ position for detection of the next negative going synchronization tip edge.

BRIEF DESCRIPTION OF THE DRAWINGS

Further details of the present invention are explained with the help of the attached drawings in which.

DETAILED DESCRIPTION

The present invention provides a circuit for establishing a sync tip baseline without clamping the most negative portion of the composite signal to a known value. Instead of clamping the sync tip, the negative peak detector follows variations in the composite signal. The circuit of the present invention includes a negative peak detector as shown in FIG. 5.

Figure 1:
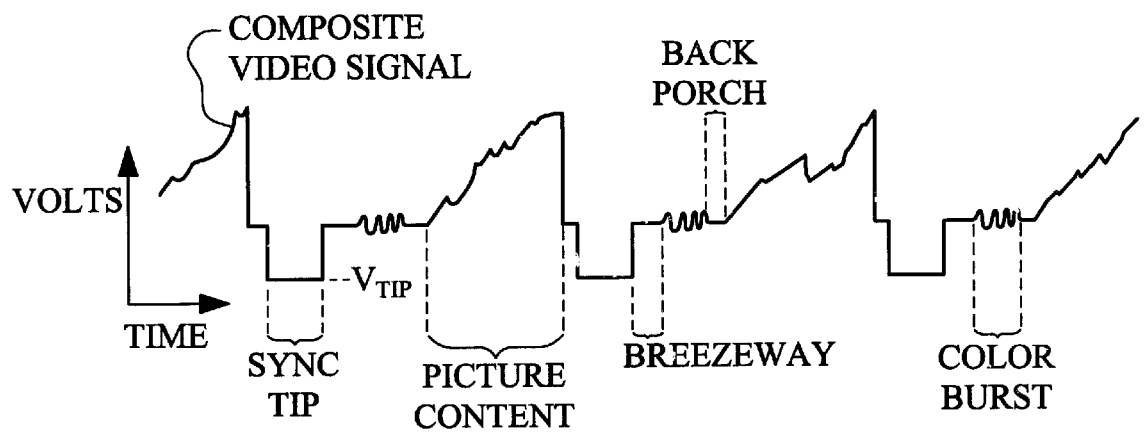
FIG. 1 shows a composite video signal.
Figure 2:
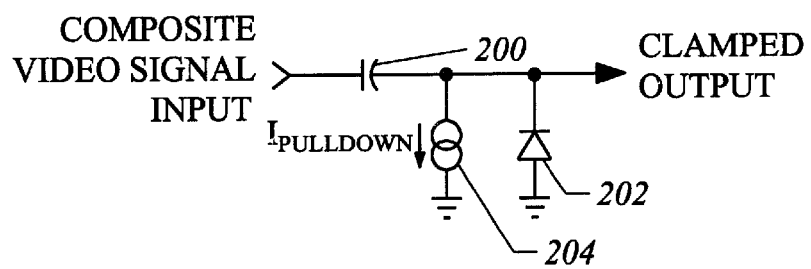
FIG. 2 shows a prior art circuit for clamping the most negative voltage of a composite video signal.
Figure 3:
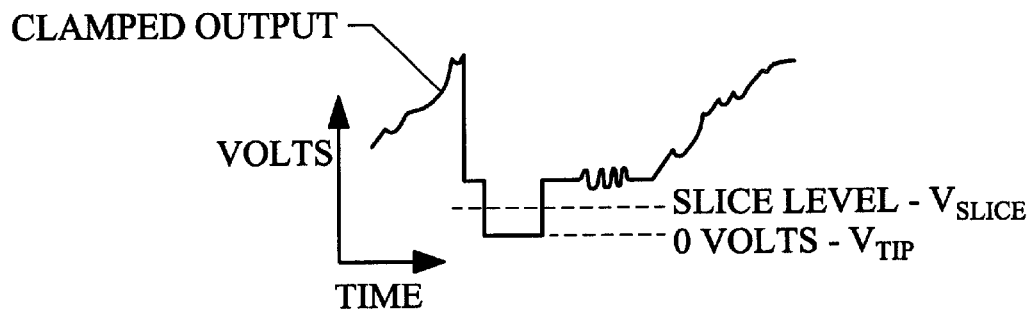
FIG. 3 shows a clamped composite video signal output from the circuit of FIG. 2.
Figure 4:
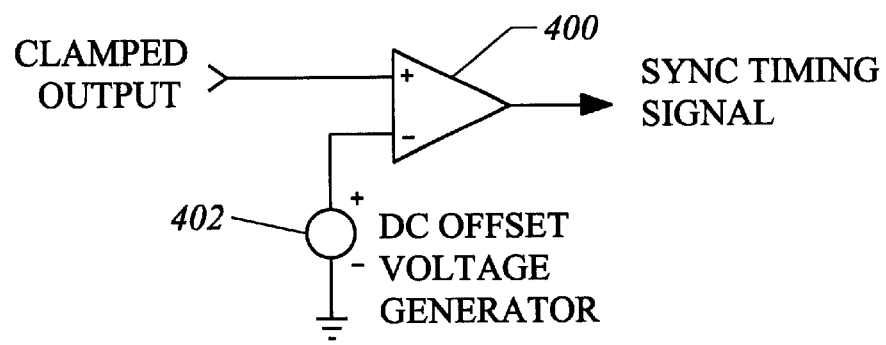
FIG. 4 shows circuitry used with the circuitry of FIG. 2 to generate a synchronization timing signal.
Figure 5:
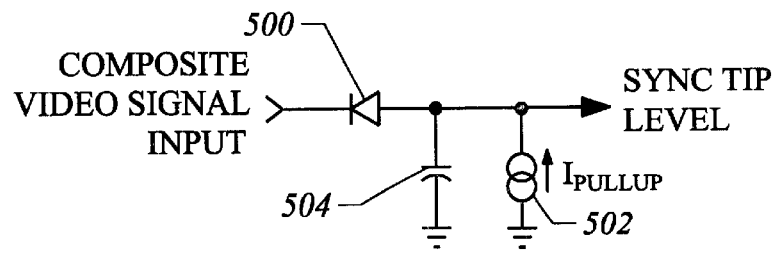
FIG. 5 shows a negative peak detector according to the present invention for providing a voltage reference at the sync tip voltage level of a composite video signal.

As shown in FIG. 5, the negative peak detector is a rectifier including a p-n type bipolar diode 500, or other rectifying element, with the composite video signal provided to the n terminal and the sync tip level output provided at the p terminal. The negative peak detector also includes a weak current source 502 and a capacitor 504 connecting the p terminal of diode 500 to ground. The current source 502 functions to charge the capacitor 504. The output of the negative peak detector is a reference voltage which tracks the sync tip voltage level $V_{TIP}$.

Figure 6:
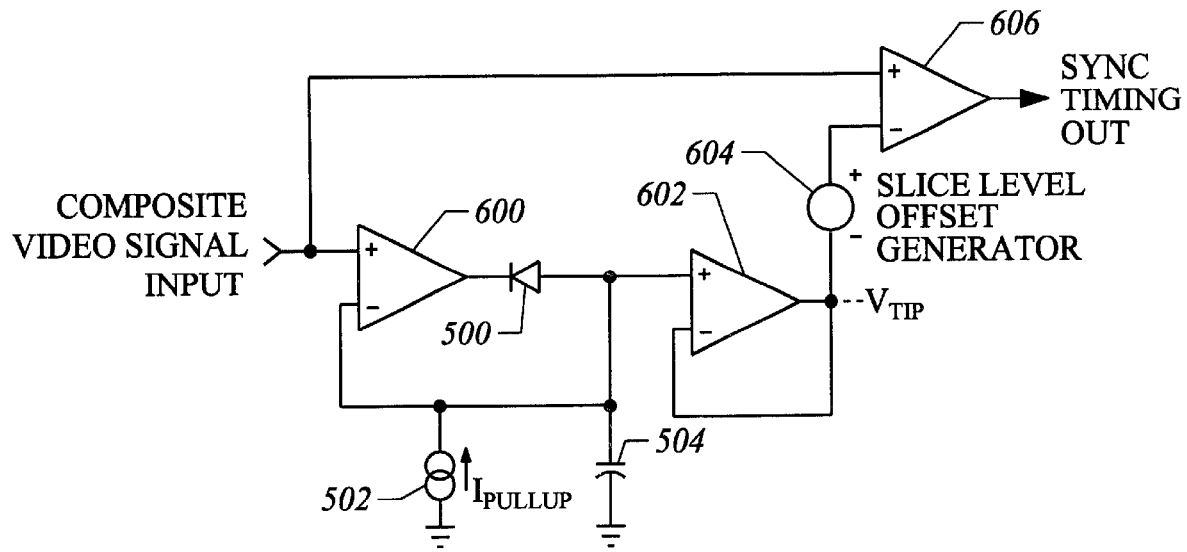
FIG. 6 shows the negative peak detector of FIG. 5 with buffering at its input and output, and with additional circuitry to generate a sync timing signal.

FIG. 6 shows the negative peak detector of FIG. 5 with buffering at its input and output, and with additional circuitry to generate a sync timing signal. Components carried over from FIG. 5 to FIG. 6, as well as components carried over in subsequent drawings, are similarly labeled.

Buffering at the input of the negative peak detector is provided by an operational amplifier 600. Amplifier 600 has a noninverting input receiving the composite video signal, an inverting input connected to the p terminal of the diode 500, and an output connected to the n terminal of diode 500. The amplifier 600 forms an operational rectifier with the diode 500 and, thus, buffers current drawn from the current source 502 from the composite video signal. The amplifier 600 also eliminates diode offset voltage errors with diode 500 not being ideal.

Buffering at the output of the negative peak detector is provided by operational amplifier 602. The amplifier 602 is connected as a voltage follower with a noninverting input connected to the p terminal of the diode 500, and its output and inverting input connected together. The amplifier 602 buffers the sync tip level voltage $V_{TIP}$ on the capacitor 504 from any load.

An amplifier 606 configured as a comparator, and a slice level generator 604 are included with the amplifiers 600 and 602 and negative peak detector to provide a synchronous timing signal. The composite video signal is provided to the noninverting input of the comparator 606. The output of amplifier 602 is provided through a slice level offset generator 604 to the inverting input of the comparator 606. Synchronization timing signals are produced at the output of comparator 606.

In one embodiment, the slice level offset generator 604 generates a fixed DC voltage $V_{SLICE}$ which is added to $V_{TIP}$ at the output of amplifier 602. The output of the comparator 606 will then transition when the composite video signal transitions through the voltage level $V_{TIP}+V_{SLICE}$.

Figure 7:
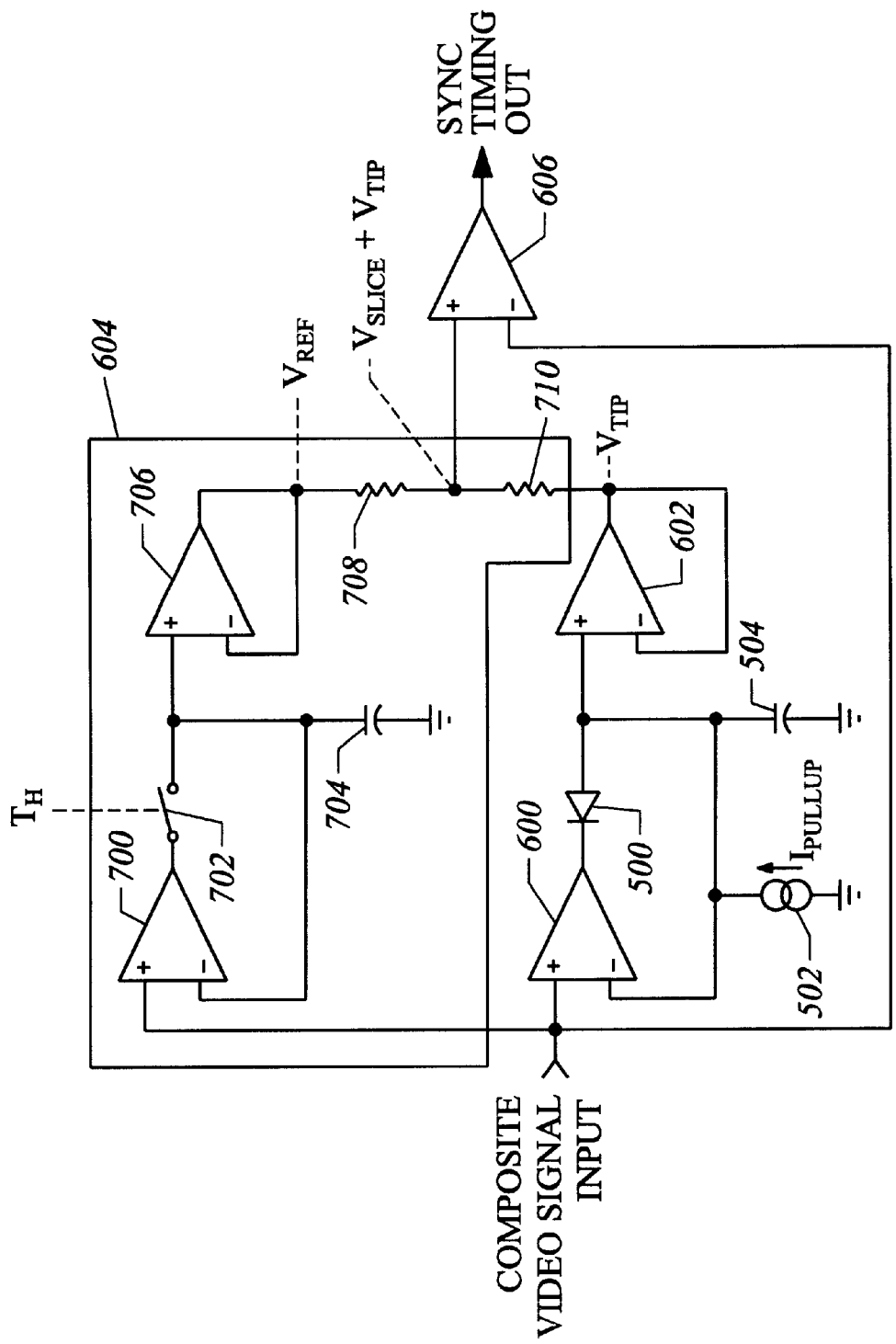
FIG. 7 shows the video synchronization signal generating circuit of FIG. 6 with components for a slice level offset generator providing an adaptive $V_{SLICE}$ value.

Because the composite video signal has a varying amplitude, it may be desirable to have an adaptive rather than a constant $V_{SLICE}$ value. FIG. 7 shows specific components for an embodiment of the slice level generator 604 which can provide such an adaptive $V_{SLICE}$ value.

The offset slice generator 604 of FIG. 7 and includes a sample and hold circuit made up of amplifier 700, switch 702 and capacitor 704. The noninverting input of amplifier 700 receives the composite video signal, while the inverting input of the amplifier is connected by the switch 702 to its output. The noninverting input of amplifier 700 is also connected to capacitor 704. The switch is selectively switched by a signal $T_H$ which is timed to close the switch during the breezeway, color burst or back porch segments of the composite video signal, or during any combination of the breezeway, color burst or back porch segments. The capacitor 704, thus, stores a voltage $V_{REF}$ equal to the sampled voltage of the breezeway, color burst, or back porch segments, or the desired combination of these segments.

The voltage held by the capacitor 704 is buffered by operational amplifier 706 and applied to a resistor divider made up of resistors 708 and 710. The operational amplifier 706 is connected in a voltage follower configuration with its noninverting input connected to the inverting input of the amplifier 700, and its inverting input connected to its output. The output of the amplifier 706 is connected to a first terminal of resistor 708, while the output of amplifier 602 is connected to the first terminal of resistor 710. The second end of resistors 708 and 710 are both connected to the noninverting input of comparator 606.

With resistors 708 and 710 having equal values, the output of the comparator 606 will transition when the composite video signal passes through $V_{TIP}+V_{SLICE}$ with $V_{SLICE}$ being halfway between $V_{TIP}$ and $V_{REF}$. The present invention can, thus, provides an adaptive $V_{SLICE}$ value.

With the circuit of FIG. 7, the offset of all four amplifiers 600, 602, 700 and 706, and the comparator 606 can add to cause undesirable errors in the desired signal $V_{TIP}+V_{SLICE}$. Errors in the value for $V_{TIP}+V_{SLICE}$ show as timing errors since the input to the circuit of FIG. 7 does not have a large slew rate, and even non-functionality if the errors accumulate large compared to undersized input signals.

Figure 8:
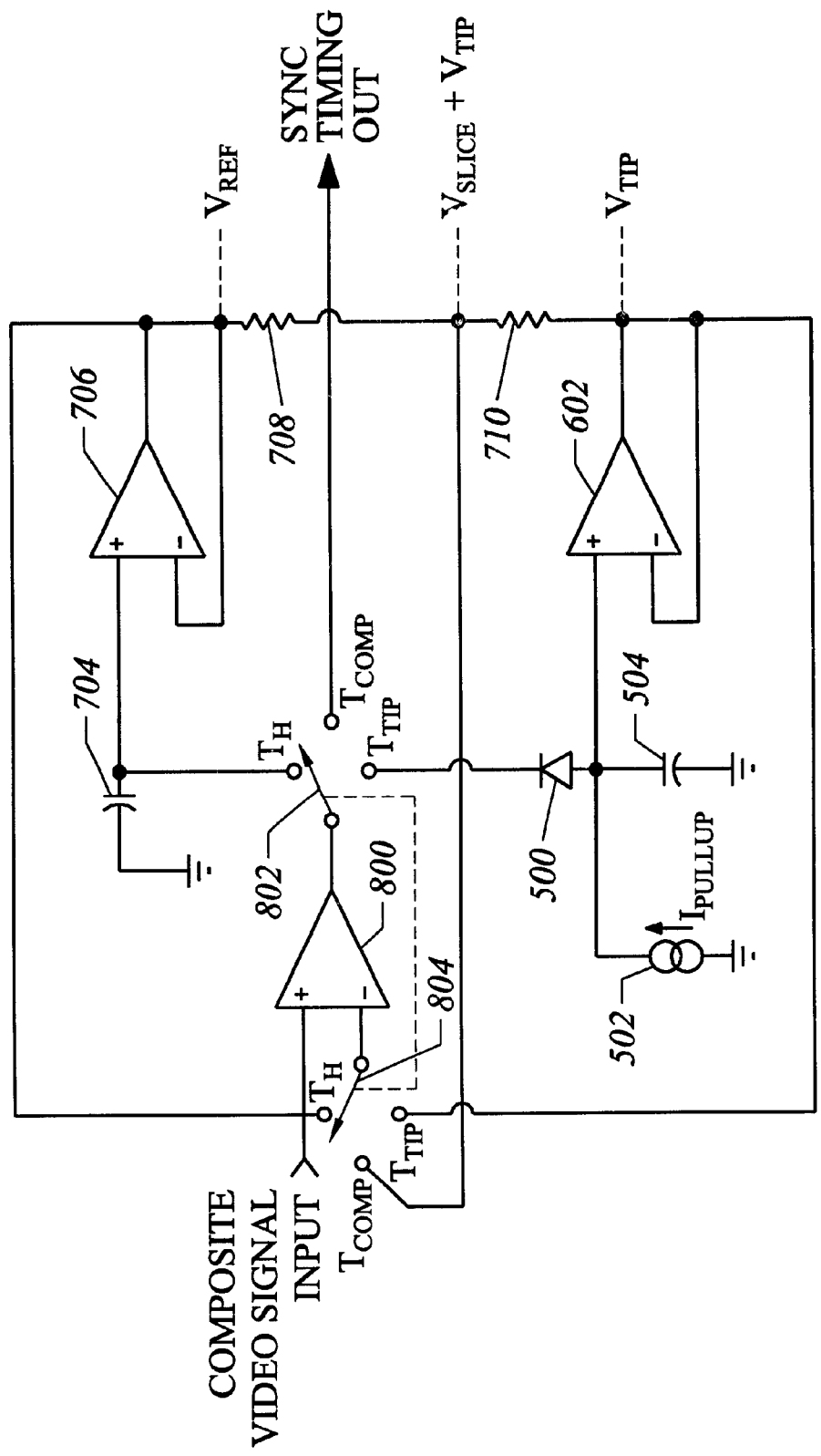
FIG. 8 shows a video synchronization signal generating circuit enabling elimination of amplifier DC offset voltages.

FIG. 8 shows an embodiment of a video synchronization signal generating circuit in accordance with the present invention which enables elimination of amplifier DC offset voltages.

The circuit of FIG. 8 includes an amplifier 800 and switches 802 and 804 to selectively connect the amplifier 800 to different components. The noninverting (+) input of the amplifier 800 receives the composite video signal input. The switch 802 connects the output of the amplifier 800 to one of three terminals labeled $T_H$, $T_{COMP}$ and $T_{TIP}$. The switch 804 connects the inverting (−) input of the amplifier 800 to one of three terminals labeled $T_H$, $T_{COMP}$ and $T_{TIP}$ to correspond with the connections for switch 802. The switches 802 and 804 are controlled to switch together to a terminal with a common label.

When the switches 802 and 804 are set to the $T_{COMP}$ connections, the amplifier 800 acts as a comparator with no feedback to compare the value $V_{SLICE}+V_{TIP}$ with the composite video signal. The switches 802 and 804 are preferably set to the $T_{COMP}$ positions during a majority of the composite video signal prior to the negative synchronization tip edge.

With the switches 802 and 804 in the $T_{COMP}$ position, the (−) input of the amplifier 800 is connected to the output of amplifier 602. Like the amplifier 602 in FIGS. 6 and 7, the amplifier 602 in FIG. 8 is connected in a voltage follower configuration with its (+) input connected to a negative peak detector formed by diode 500, capacitor 504 and current source 502. The diode 500 is disconnected from the output of the amplifier 800 when the switches 802 and 804 are connected in the $T_{COMP}$ position, but the capacitor 504 will store the voltage value $V_{TIP}$ of the synchronization tip. The value $V_{TIP}$ is measured and stored by capacitor 504 after the negative edge of the synchronization tip signal with the switches 802 and 804 connected to the $T_{TIP}$ connections, as discussed in detail to follow.

The output of the amplifier 602 is connected to the (−) input of the amplifier 800 through a resistor 710 when the switches 802 and 804 are in the $T_{COMP}$ position. Also, the (−) input of the amplifier 800 is connected to the output of amplifier 706 through resistor 708. The amplifier 706 is connected in a voltage follower configuration similar to the amplifier 706 of FIG. 7. The capacitor 704 is charged up to a voltage $V_{REF}$ equal to the sampled voltage of the breezeway, color burst, or back porch segments, or the desired combination of these segments. The capacitor 704 is charged up to $V_{REF}$ when the switches 802 and 804 are in the $T_H$ position as described in more detail to follow.

With resistors 708 and 710 having equal values, the output of the amplifier 800 will transition when the composite video signal passes through $V_{TIP}+V_{SLICE}$, $V_{SLICE}$ being half way between $V_{TIP}$ and $V_{REF}$. Further, any offset in amplifier 800 is stored in capacitors 504 and 704 and is superimposed on the $V_{SLICE}$ value by amplifiers 602 and 706 and fed back to the (−) input of amplifier 800. Functioning as a comparator, the offset of the amplifier 800 is now cancelled with respect to the input. Any offset of amplifiers 602 and 706 will be reduced by the voltage gain of amplifier 800 with respect to the input of the synchronous detector circuit.

After the output of the synchronous detector circuit signals the negative edge of the synchronization tip, the switches 802 and 804 are set to $T_{TIP}$. The amplifier 800 then is disconnected from providing the sync timing output signal and acts only as a buffer for a negative peak detector. The amplifier 800 has a (+) input receiving the composite video signal as in FIGS. 6 and 7, but instead of having the (−) input connected directly to the p terminal of the diode 500, the (−) input is buffered from the diode 500 through the voltage follower amplifier 602. As connected, the amplifier 800 will reduce the offset of diode 500 as well as the offset of amplifier 602.

The switches 802 and 804 are left in the $T_{TIP}$ position until the capacitor 504 charges up to the synchronization tip voltage level $V_{TIP}$. After a time period for the capacitor 504 to adequately charge, the switches 802 and 804 are set to $T_{COMP}$ again, waiting for the positive going edge of the synchronization tip.

After the positive-going edge of the synchronous tip is perceived, the switches 802 and 804 are set to the $T_H$ connections. As with the circuit of FIG. 7, the time period for $T_H$ can be during the breezeway, color burst or back porch segments of the composite video signal, or during any combination of the breezeway, color burst or back porch segments. The switches 802 and 804 are connected to the $T_H$ connections during the desired segments and returned to the $T_{COMP}$ connections afterward.

With the switches 802 and 804 connected in the $T_H$ position, the amplifier 800 functions similar to the amplifier 700 of FIG. 7 with capacitor 704 to form a sample and hold circuit. Rather than being connected directly to the capacitor 604 like the (−) input of amplifier 700 of FIG. 7, the (−) input of the amplifier 800 is connected to the capacitor 704 through the voltage follower amplifier 706. The offset of amplifier 706 is reduced by this loop.

With the switches 802 and 804 connected in the $T_H$ position, the capacitor 704 will charge up to and store a voltage $V_{REF}$ equal to the sampled voltage of the breezeway, color burst, or back porch segments, or the desired combination of these segments. After the desired segments, the switches 802 and 804 will be placed in the $T_{COMP}$ positions until the negative going edge of the synchronization tip is detected again.

Although the invention has been described above with particularity, this was merely to teach one of ordinary skill in the art how to make and use the invention. Many modifications will fall within the scope of the invention, as that scope is defined by the claims which follow.

What is claimed is:

1. A video synchronization signal generating circuit comprising:

a negative peak detector having an input and an output;

a first amplifier having a first input coupled to an input of the video synchronization signal generating circuit, a second input, and an output coupled to provide an output of the video synchronization signal generating circuit;

a second amplifier having a first input coupled to the output of the negative peak detector, a second input coupled to the input of the video synchronization signal generating circuit, and an output coupled to the input of the negative peak detector; and means for providing a voltage offset and for connecting the negative peak detector to the second input of the first amplifier, the means for providing a voltage offset adding voltage to the output of the negative peak detector so that the offset added to the output voltage from the output of the negative peak detector has a value less than a total voltage level of a sync pulse in a composite video signal provided to the input of the video synchronization signal generating circuit.

2. The circuit of claim 1, wherein the negative peak detector comprises a rectifier.

3. The circuit of claim 2, wherein the rectifier comprises:

a capacitor coupling the output of the negative peak detector to a voltage potential;

a current source coupled to the output of the negative peak detector; and a rectifying element having a first terminal coupled to the output of the negative peak detector, and a second terminal coupled to the input of the negative peak detector.

4. The circuit of claim 2, wherein the rectifying element is a p-n diode.

5. The video synchronization signal generating circuit of claim 1 wherein the means for providing a voltage offset comprises a voltage supply.

6. The video synchronization signal generating circuit of claim 1 wherein the means for providing a voltage offset comprises:

series resistors with a first terminal connectable to the negative peak detector, a second terminal, and a center terminal between the series resistors connected to the second end of the first amplifier; and a sample and hold circuit connectable to the second terminal of the series resistors.

7. The video synchronization signal generating circuit of claim 1 wherein the video sync pulse has a negative peak voltage value, and an edge portion with a DC offset to creating a positive voltage pulse.

8. The circuit of claim 1, further comprising:

a third amplifier having first terminal and an output coupled together, and having a second terminal coupled to the output of the negative peak detector.

9. The circuit of claim 2, wherein:

the p-n diode includes an n terminal and a p terminal;

the n terminal of the p-n diode coupled to the output of the second amplifier; and the p terminal of the p-n diode coupled to the output of the negative peak detector.

10. A video synchronization signal generating circuit comprising:

a negative peak detector having an input and an output;

a first amplifier having a first input coupled to the input of the video synchronization signal generating circuit, a second input coupled to the output of the negative peak detector, and an output coupled to provide an output of the video synchronization signal generating circuit;

a second amplifier having an inverting terminal coupled to the output of the negative peak detector, a noninverting terminal coupled to the input of the video synchronization signal generating circuit, and having an output coupled to the input of the negative peak detector;

a third amplifier having an inverting terminal and an output coupled together, and having a noninverting terminal coupled to the output of the negative peak detector; and an offset generator coupling the output of the third amplifier to the second input of the first amplifier.

11. The circuit of claim 10, wherein the offset generator comprises:

a resistor divider including series connected resistors having a first end terminal coupled to the output of the third amplifier, a center terminal coupled to the second input of the first amplifier, and a second end terminal; and a sample and hold circuit having an input coupled to the input of the video synchronization signal generating circuit, an output coupled to the second end terminal of the resistor divider, and a sample control terminal receiving a signal with a pulse having a time period substantially equal to a portion of a composite video signal provided to the input of the video synchronization signal generating circuit.

12. The circuit of claim 11, wherein the portion of the composite video signal includes at least one segment from a group consisting of the following: a breezeway segment, a color burst segment, and a backporch segment.

13. The circuit of claim 12, wherein the sample and hold circuit comprises:

a fourth amplifier having a noninverting input forming the input of the sample and hold circuit, an inverting input coupled to the second end terminal of the resistor divider, and an output;

a capacitor coupling the inverting input of the fourth amplifier to a voltage potential; and a switch having a first terminal coupled to the output of the fourth amplifier, a second terminal coupled to the inverting terminal of the fourth amplifier, and a control input forming the sample control terminal of the sample and hold circuit.

14. The circuit of claim 13, further comprising:

a fifth amplifier having an output and inverting terminal connected to the second end terminal of the resistor divider and having a noninverting terminal coupled to the second terminal of the switch.

15. A video synchronization signal generating circuit comprising:

a first amplifier having a noninverting input forming the input of the video synchronization signal generating circuit, an inverting input and an output;

a rectifying element having a first terminal coupled to the output of the first amplifier, and a second terminal coupled to the inverting input of the first amplifier;

a first capacitor connecting the inverting input of the first amplifier to ground;

a current source connected to the inverting input of the first amplifier;

a second amplifier having a inverting input and an output coupled together, and having an noninverting input coupled to the inverting input of the first amplifier;

a resistor divider including series connected resistors having a first end terminal coupled to the output of the second amplifier, a center terminal, and a second end terminal;

a third amplifier having a first input connected to the center terminal of the resistor divider, a second input, and an output providing the output of the video synchronization signal generating circuit;

a fourth amplifier having a noninverting input connected to the input of the video synchronization signal generating circuit, an inverting input and an output;

a second capacitor coupling the inverting input of the fourth amplifier to ground;

a switch having a first terminal coupled to the output of the fourth amplifier, a second terminal coupled to the inverting terminal of the fourth amplifier, and a control input; and a fifth amplifier having an output and inverting input connected to the second end terminal of the resistor divider and having a noninverting input coupled to the second terminal of the switch.

16. The circuit of claim 15, wherein the control input of the switch receives a signal having a pulse duration substantially equal to a time for at least one segment of a composite video signal from a group consisting of the following: a breezeway segment, a color burst segment, and a back porch segment.

17. A video synchronization signal generating circuit comprising:

a first amplifier having a first input providing an input of the video synchronization signal generating circuit, a second input and an output;

a first switch having a main terminal coupled to the second input of the first amplifier, a TCOMP terminal, a TTIP terminal, a TH terminal, and a control terminal for selectively connecting the first switch between the main terminal and one of the TCOMP, TH and TTIP terminals;

a second switch having a main terminal coupled to the output of the first amplifier, a TCOMP terminal providing an output of the video synchronous signal generating circuit, a TTIP terminal, a TH terminal, and a control input for selectively connecting the second switch between its main terminal and one of its TCOMP, TH and TTIP terminals in correspondence with connection of the first switch to its TCOMP, TH and TTIP terminals;

a negative peak detector having an input coupled to the TTIP terminal of the second switch, and having an output;

a second amplifier having a first input terminal coupled to the output of the negative peak detector, and a second input and output coupled together and to the TTIP terminal of the first switch;

a sample and hold capacitor having a first terminal coupled to the TH terminal of the second switch, and a second terminal coupled to ground;

a third amplifier having a first input terminal coupled to the first terminal of the sample and hold capacitor, and a second input and output coupled together and to the TH terminal of the first switch; and a resistor divider comprising a first resistor coupling the output of the second amplifier to the TCOMP terminal of the first switch, and a second resistor coupling the output of the third amplifier to the TCOMP terminal of the first switch.

18. The circuit of claim 17, wherein the negative peak detector comprises a rectifier.

19. A video synchronization signal generating circuit comprising:

a negative peak detector having an input coupled to an input of the video synchronization signal generating circuit for receiving a composite video signal, and having an output;

a first amplifier having a first input coupled to the input of the video synchronization signal generating circuit, a second input coupled to the output of the negative peak detector, and an output coupled to provide an output of the video synchronization signal generating circuit;

a first switch for coupling the second input of the first amplifier to the output of the negative peak detector, the first switch having a main terminal coupled to the second input of the first amplifier, a TCOMP terminal coupled to the output of the negative peak detector, a TTIP terminal coupled to the output of the negative peak detector, a TH terminal, and a control input for selectively connecting the first switch between the main terminal and one of the TCOMP, TH and TTIP terminals;

a second switch for coupling the output of the first amplifier to the output of the video synchronization signal generating circuit and for coupling the input of the negative peak detector to the input of the video synchronization signal generating circuit, the second switch having a main terminal coupled to the output of the first amplifier, a TCOMP terminal coupled to the output of the video synchronous signal generating circuit, a TTIP terminal coupled to the input of the negative peak detector, a TH terminal, and a control input for selectively connecting the second switch between its main terminal and one of its TCOMP, TH and TTIP terminals in correspondence with connection of the first switch to its TCOMP, TH and TTIP terminals;

a sample and hold capacitor having a first terminal coupled to the TH terminal of the second switch, and a second terminal coupled to ground; and a resistor divider comprising a first resistive element coupling the output of negative peak detector to the TCOMP terminal of the first switch, and a second resistive element coupling the first terminal of the sample and hold capacitor to the TCOMP terminal of the first switch.

20. The circuit of claim 19, further comprising:

a second amplifier connected as a voltage follower for coupling the output of the negative peak detector to the first resistive element and to the $T_{TIP}$ terminal of the first switch, the second amplifier having a first input terminal coupled to the output of the negative peak detector, and a second input and output coupled together and to the $T_{TIP}$ terminal of the first switch and to the first resistive element.

21. The circuit of claim 19, further comprising:

a second amplifier connected as a voltage follower for coupling the first terminal of the sample and hold capacitor to the second resistive element and to the $T_H$ terminal of the first switch, the second amplifier having a first input terminal coupled to the first terminal of the sample and hold capacitor, and a second input and output coupled together to the $T_H$ terminal of the first switch and to the second resistive element.

22. The circuit of claim 19, wherein the negative peak detector comprises:

a rectifying element having a first terminal coupled to the $T_{TIP}$ terminal of the second switch forming the input of the negative peak detector, and a second terminal forming the output of the negative peak detector;

a first capacitor coupling the second terminal of the rectifying element to a voltage potential; and a current source coupled to the second terminal of the rectifying element.

23. A video synchronization signal generating circuit comprising:

a first amplifier having a first input providing an input of the video synchronization signal generating circuit, a second input and an output;

a first switch having a main terminal coupled to the second input of the first amplifier, a TCOMP terminal, a TTIP terminal, and a control terminal for selectively connecting the first switch between the main terminal and one of the TCOMP and TTIP terminals;

a second switch having a main terminal coupled to the output of the first amplifier, a TCOMP terminal providing an output of the video synchronization signal generating circuit, a TTIP terminal and a control input for selectively connecting the second switch between its main terminal and one of its TCOMP and TTIP terminals in correspondence with connection of the first switch to its TCOMP and TTIP terminals;

a negative peak detector having an input coupled to the TTIP terminal of the second switch, and having an output;

a second amplifier having a first input terminal coupled to the output of the negative peak detector, and a second input and output coupled together and to the TTIP terminal of the first switch; and an offset voltage generator coupling the output of the second amplifier to the TCOMP terminal of the first switch.

24. The circuit of claim 23, wherein the offset voltage generator comprises:

a first resistor coupling the output of the second amplifier to the $T_{COMP}$ terminal of the first switch; and a second resistor coupling the $T_{COMP}$ terminal to a voltage reference.

25. The circuit of claim 23, wherein the negative peak detector comprises:

a rectifying element having a first terminal coupled to the $T_{TIP}$ terminal of the second switch, and a second terminal coupled to the first input of the second amplifier;

a first capacitor coupling the second terminal of the rectifying element to a voltage potential; and a current source coupled to the second terminal of the rectifying element.

26. A video synchronization signal generating circuit having an input and an output, comprising:

a negative peak detector having an input and an output;

a first amplifier having a first input coupled to the input of the video synchronization signal generating circuit, a second input, and an output coupled to the output of the video synchronization signal generating circuit; and a second amplifier having a first input coupled to the output of the negative peak detector, a second input coupled to the input of the video synchronization signal generating circuit, and an output coupled to the input of the negative peak detector.

* * * * *